(12) United States Patent
Weiss et al.

(10) Patent No.: US 8,061,667 B2
(45) Date of Patent: Nov. 22, 2011

(54) MOUNTING DEVICE FOR BICYCLE CONTROL COMPONENTS

(75) Inventors: Martin Weiss, Schweinfurt (DE); Scott McLaughlin, Chicago, IL (US); Paul Feuerstein, Brookfield, IL (US)

(73) Assignee: SRAM, LLC, Chicago, IL (US)

( * ) Notice: Subject to any disclaimer, the term of this patent is extended or adjusted under 35 U.S.C. 154(b) by 13 days.

(21) Appl. No.: 12/762,155

(22) Filed: Apr. 16, 2010

(65) Prior Publication Data
US 2011/0253863 A1    Oct. 20, 2011

(51) Int. Cl.
*A47B 96/06* (2006.01)
(52) U.S. Cl. .................. 248/230.4; 248/229.13
(58) Field of Classification Search ............... 248/230.4, 248/230.1, 316.1, 316.5, 229.13, 229.23, 248/231.51, 74.1; 74/502.2
See application file for complete search history.

(56) References Cited

U.S. PATENT DOCUMENTS

| 4,974,469 | A |   | 12/1990 | Romano |
|---|---|---|---|---|
| 5,203,213 | A | * | 4/1993 | Nagano ........................ 74/473.14 |
| 5,701,786 | A |   | 12/1997 | Kawakami |
| D392,233 | S |   | 3/1998 | Masui |
| 6,305,237 | B1 |   | 10/2001 | Ichida |
| 2006/0053940 | A1 |   | 3/2006 | McLaughlin et al. |
| 2007/0068316 | A1 | * | 3/2007 | Kawakami et al. .......... 74/502.2 |
| 2007/0137385 | A1 |   | 6/2007 | Cesur et al. |
| 2007/0151395 | A1 |   | 7/2007 | Barnett |
| 2007/0199401 | A1 |   | 8/2007 | Kawakami et al. |
| 2008/0092690 | A1 |   | 4/2008 | Kawakami |
| 2010/0139442 | A1 |   | 6/2010 | Tsumiyama |

FOREIGN PATENT DOCUMENTS

| EP | 1 046 385 B1 | 10/2000 |
|---|---|---|
| JP | 54-28851 | 2/1979 |
| JP | 63-312291 | 12/1988 |
| JP | 63-315390 | 12/1988 |
| JP | 01-134591 | 9/1989 |
| JP | 01-157091 | 10/1989 |
| JP | 2000-2256974 | 8/2000 |

* cited by examiner

*Primary Examiner* — Ramon Ramirez
(74) *Attorney, Agent, or Firm* — Milan Milosevic; Lisa Serdynski; Steven Courtright

(57) ABSTRACT

A mounting device for mounting first and second bicycle control components to a bicycle handlebar having a handlebar axis. The mounting device generally includes first and second mounting brackets. The first mounting bracket is adjustably mounted to the handlebar about the handlebar axis. One of the first and second bicycle control components is attached to the first mounting bracket. The second mounting bracket is adjustably attached to the first mounting bracket. The other of the first and second bicycle control components is attached to the second mounting bracket. The second mounting bracket is displaced between alternative attachment positions on the first mounting bracket. The first mounting bracket is rotated between alternative mounting positions on the handlebar.

9 Claims, 8 Drawing Sheets

MOUNTING DEVICE FOR BICYCLE CONTROL COMPONENTS

BACKGROUND OF THE INVENTION

This invention relates in general to mounting devices for mounting bicycle control components to a handlebar, and more particularly, to a mounting device that mounts at least two bicycle control components to a handlebar.

SUMMARY OF THE INVENTION

The present invention provides a mounting device for mounting first and second bicycle control components to a bicycle handlebar having a handlebar axis. The mounting device generally includes first and second mounting brackets. The first mounting bracket is adjustably mounted to the handlebar about the handlebar axis. One of the first and second bicycle control components is attached to the first mounting bracket. The second mounting bracket is adjustably attached to the first mounting bracket. The other of the first and second bicycle control components is attached to the second mounting bracket. The second mounting bracket is displaced between alternative attachment positions on the first mounting bracket. The first mounting bracket is rotated between alternative mounting positions on the handlebar.

In one embodiment of the present invention, the first and second mounting brackets are mounted substantially concentric to the handlebar. The second mounting bracket is slidably attached to the first mounting bracket along a slot between the alternative attachment positions. A third bicycle control component may be attached to one of the first and second clamp portions wherein the second bicycle control component is attached to the other of the first and second clamp portions. The first, second and third bicycle control components are a brake lever assembly, a shift lever assembly and a suspension control assembly. The first mounting bracket may include a first clamp portion attached to the first bicycle control component, a second clamp portion hingedly connected to the first clamp portion and a fastener securing the first and second clamp portions about the handlebar.

These and other features and advantages of the invention will be more fully understood from the following description of certain embodiments of the invention, taken together with the accompanying drawings.

DETAILED DESCRIPTION OF THE DRAWINGS

DETAILED DESCRIPTION

Figure 9:
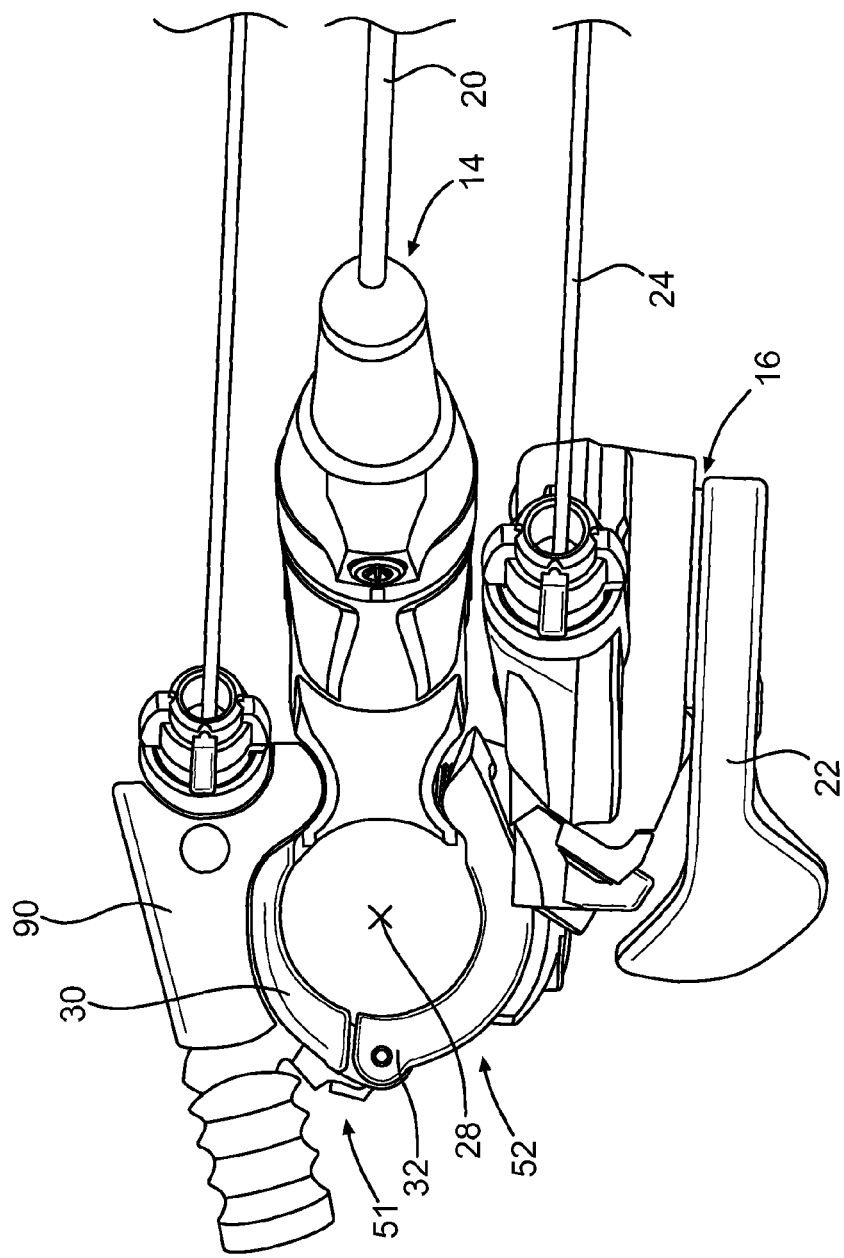
FIG. 9 is a side view of a third bicycle control component attached to a mounting device according to another embodiment of the present invention.
Figure 10:
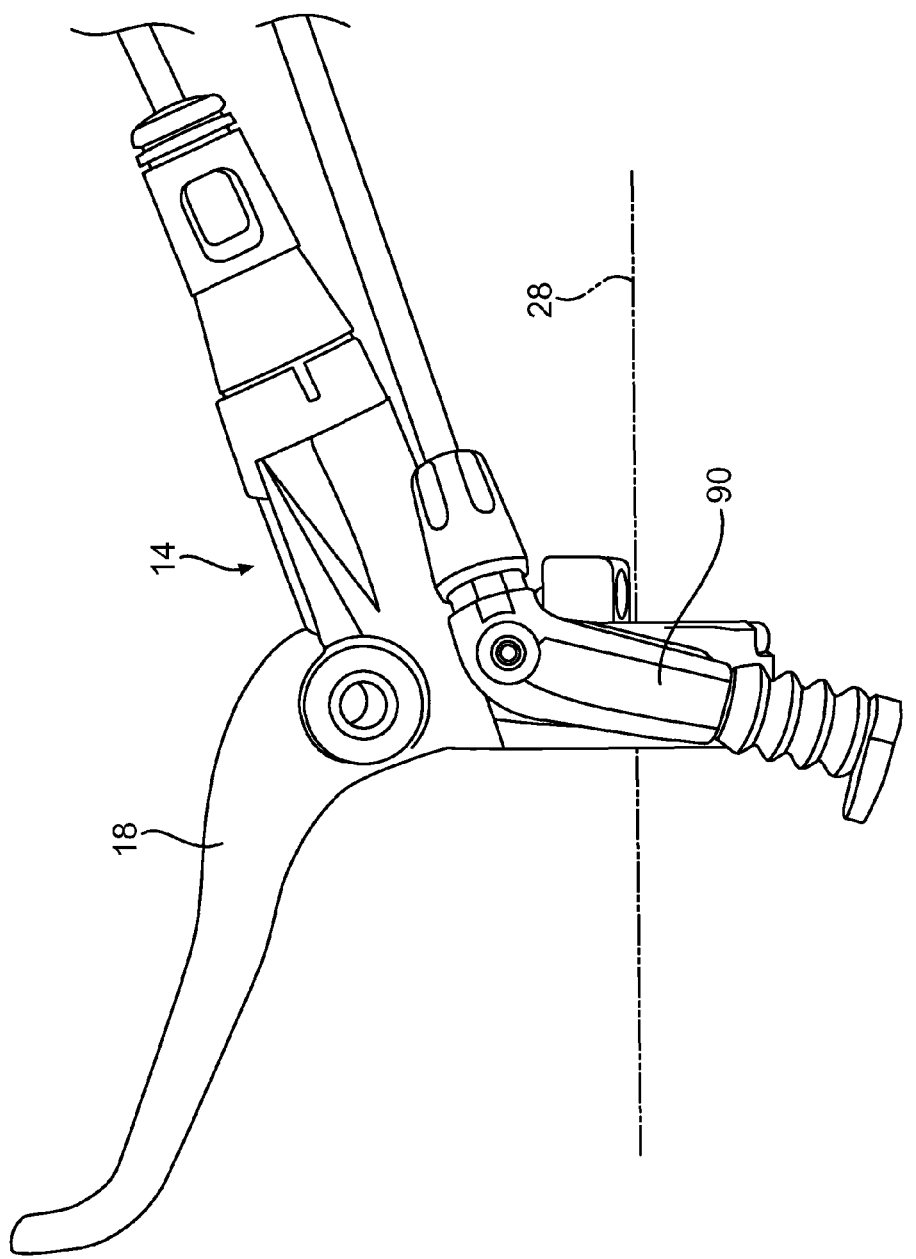
FIG. 10 is a top view of the mounting device of FIG. 9.

FIGS. 1-5, 7 and 8 illustrate a mounting device 10 for mounting first and second bicycle control components to a bicycle handlebar 12 according to one embodiment of the present invention. In this embodiment, the first and second bicycle control components are a brake lever assembly 14 and a shift lever assembly 16. An alternative mounting device may mount additional bicycle control components such a lockout device 90 for a suspension system to the handlebar 12 (see FIGS. 9 and 10). The brake lever assembly 14 includes a brake lever 18 for actuating a brake cable 20 connected to a braking device (not shown). The shift lever assembly 16 includes a pull-cable lever 22 to pull a shift control cable 24 and a release-cable lever 26 to release the shift control cable 24. The shift control cable 24 is connected to a gear change device (not shown) such as a derailleur or an internal gear hub.

The mounting device 10 generally includes first and second mounting brackets 51, 52. The first mounting bracket 51 includes first and second clamp portions 30, 32 having bores 34 at one of their ends 36, 38, respectively. The first and second clamp portions 30, 32 are hingedly connected to each other at their other ends 40, 42, respectively, by a pin 44 to form a general C-shape, matingly secure to the bicycle handlebar 12. The first mounting bracket 51 is secured to the bicycle handlebar 12 by tightening a fastener 46 extending through the bores 34 of the first and second clamp portions 30, 32. In this embodiment, the fastener 46 includes a bolt 48 and a nut 50. Looking to FIGS. 9 and 10, the lockout device 90 is attached to the first clamp portion 30 of the first mounting bracket 51.

Figure 1:
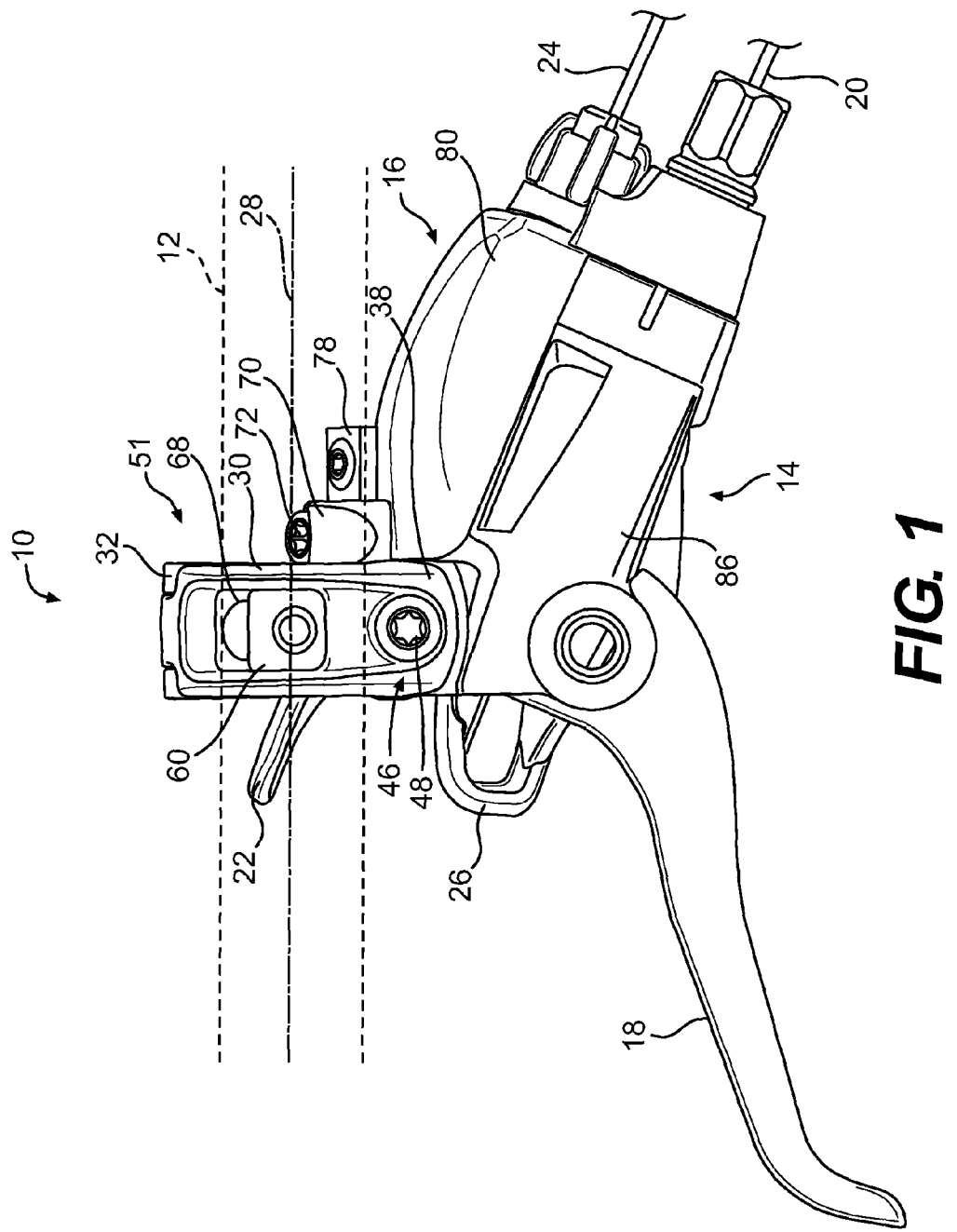
FIG. 1 is a front view of a mounting device for mounting a brake lever assembly and a shift lever assembly to a bicycle handlebar.
Figure 2:
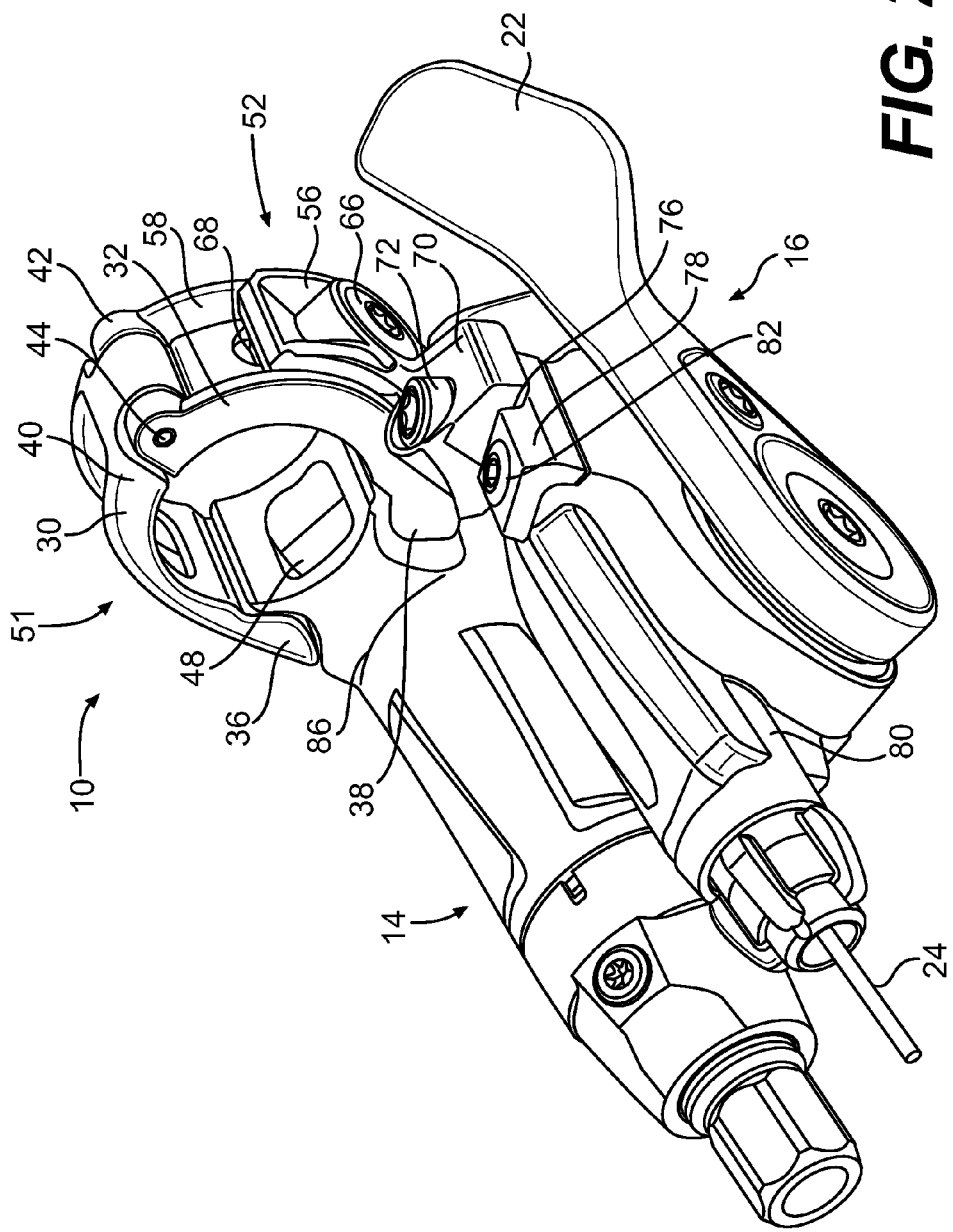
FIG. 2 is a perspective view of the brake lever assembly, shift lever assembly and the mounting device of FIG. 1.
Figure 3:
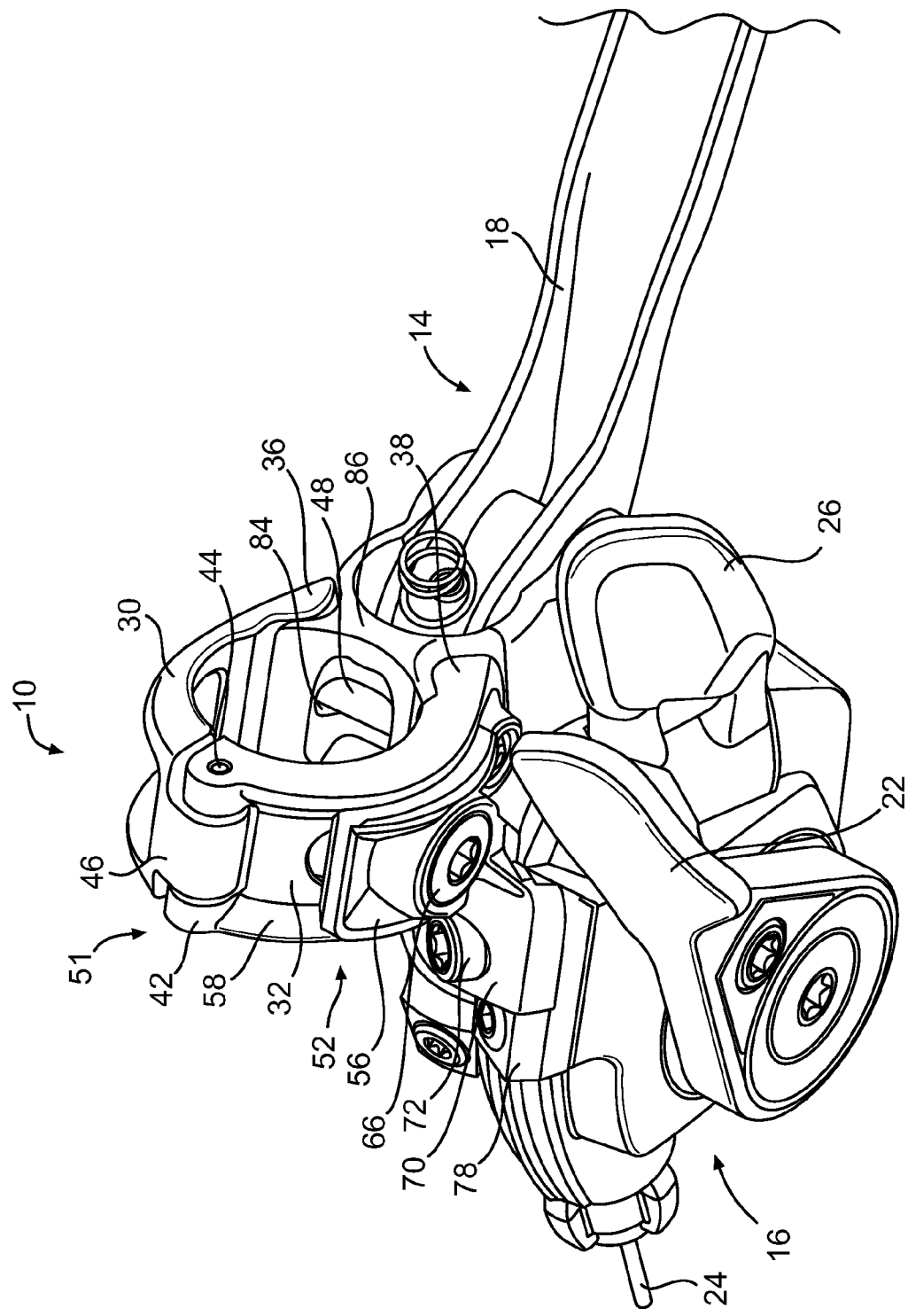
FIG. 3 is a perspective view of the brake lever assembly, shift lever assembly and the mounting device of FIG. 1.
Figure 5:
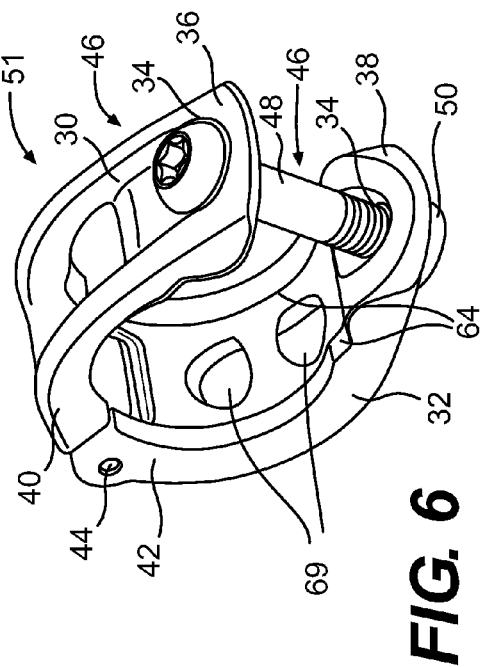
FIG. 5 is a perspective view of a first mounting bracket of the mounting device of FIG. 1.
Figure 6:
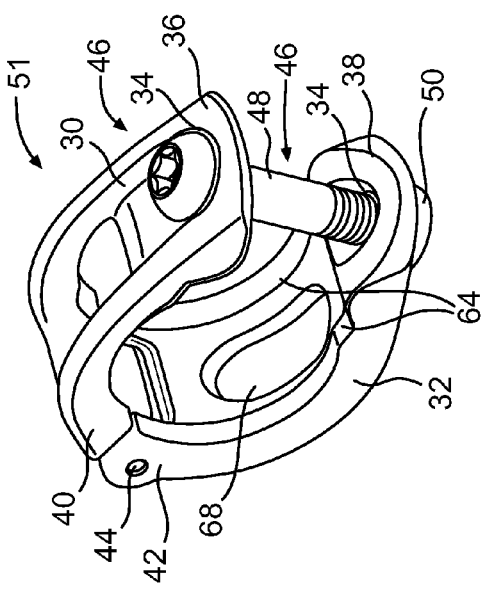
FIG. 6 is a perspective view of a first mounting bracket of a mounting device according to another embodiment of the present invention.
Figure 4:
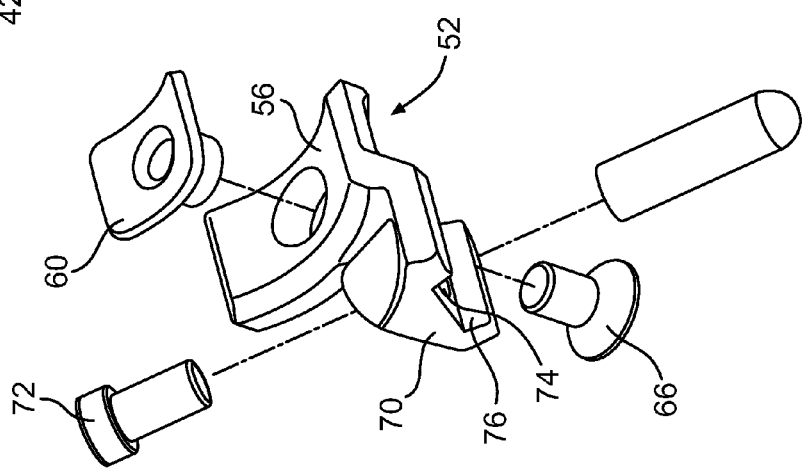
FIG. 4 is an exploded view of a second mounting bracket of the mounting device of FIG. 1.

The second mounting bracket 52 is slidably attached to an outer surface of the second clamp portion 32 of the first mounting bracket 51. The second mounting bracket 52 includes an upper portion 56 slidably attached to an outer guide rail 58 on the outer surface of the second clamp portion 32 and a lower portion 60 attached to an inner surface of the second clamp portion 32 and slidable along an inner guide rail 64. The guide rails 58, 64 also prevent rotation of the second mounting bracket 54 relative to the second clamp portion 32. The upper and lower portions 56, 60 are connected by a fastener such as a screw 66 that extends through a slot 68 in the second clamp portion 32. The length of the slot 68 determines the outermost attachment positions of the second mounting bracket 52 on the second clamp portion 32. The upper and lower portions 56, 60 of the second mounting bracket 52 are curved to matingly engage the second clamp portion 32. The upper and lower portions 56, 60 may be fixed in a particular attachment position along the slot 68 by tightening the screw 66. Alternatively, the slot 68 may be replaced with discrete bores 69 to provide alternative predetermined attachment positions of the shift lever assembly 16 on the mounting device 10 (see FIG. 6).

The second mounting bracket 52 also includes a flange 70 that extends substantially perpendicular from the upper portion 56. The shifter lever assembly 16 is attached to the flange 70 with a fastener 72 extending through a bore 74 in the flange 70. More specifically, the flange 70 includes a longitudinal rail 76 that engages a longitudinal guide 78 on a housing 80 of the shift lever assembly 16. The longitudinal guide 78 includes at least two bores 82 for mounting the mounting device 10 at different positions on the housing 80. The bores 82 are spaced apart from one another along a direction parallel to the handlebar 12. Alternatively, the two bores 82 may be replaced with a slot.

Figure 7:
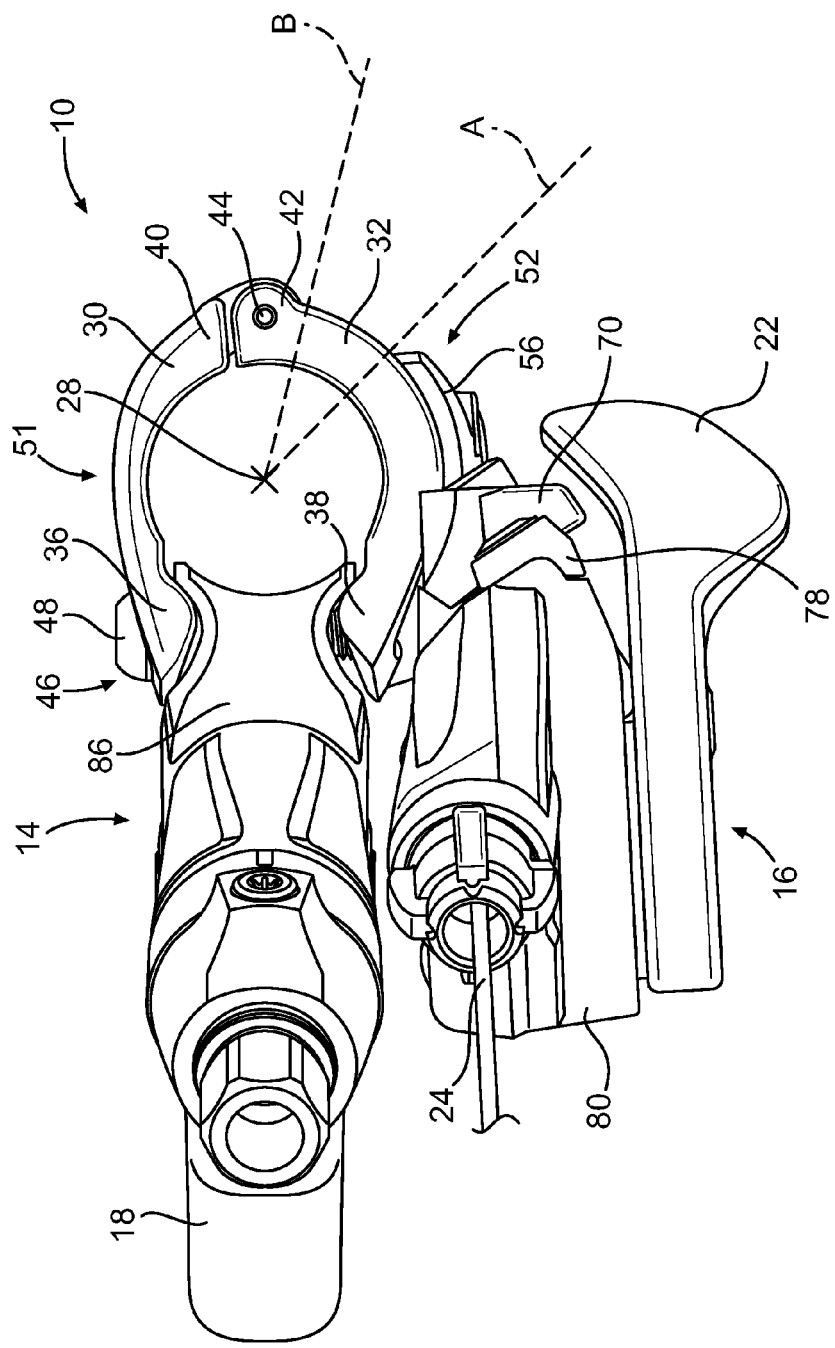
FIGS. 7 and 8 are side views of the mounting device of FIG. 1 showing the shift lever assembly attached to the mounting device in alternative attachment positions A and B.
Figure 8:
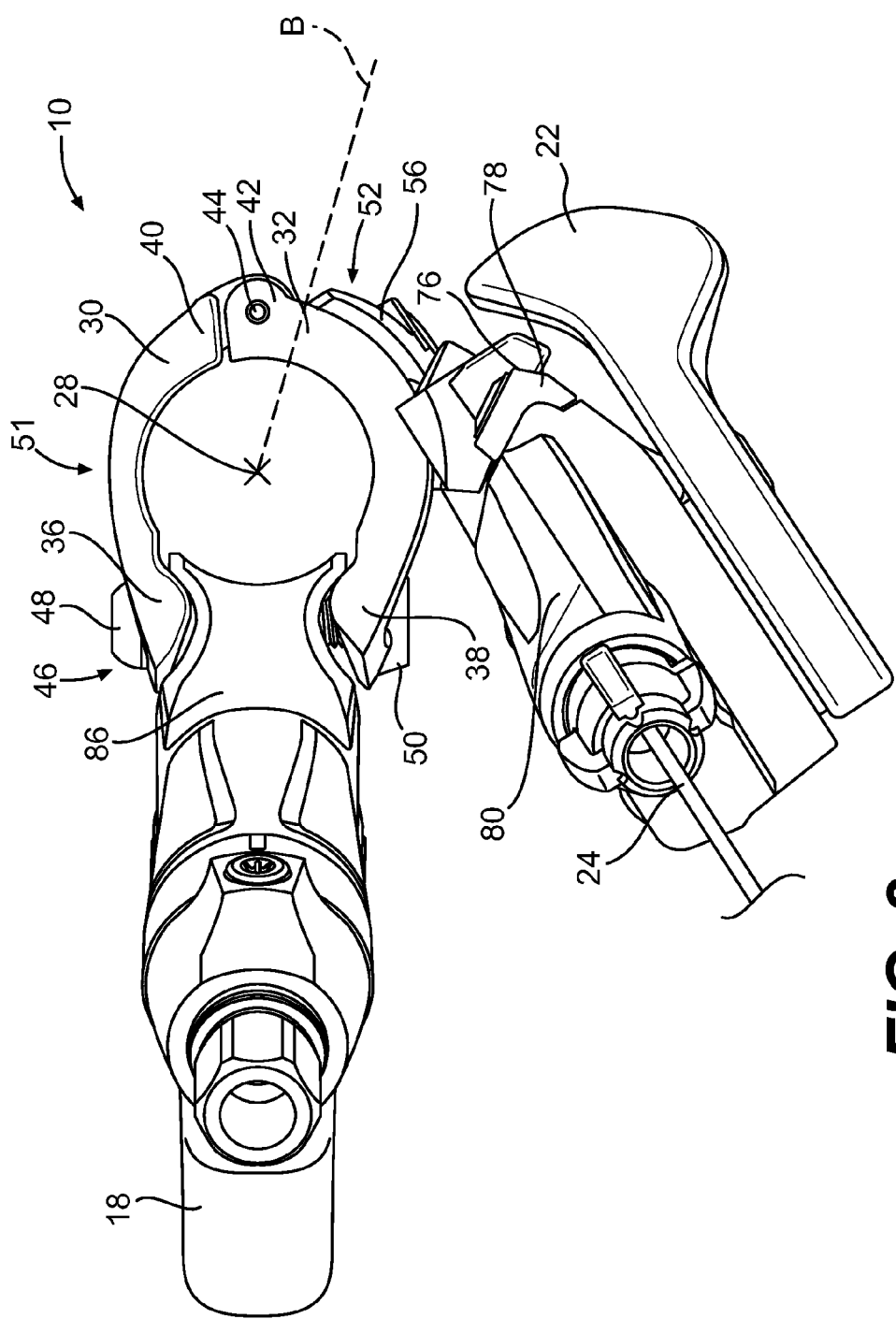

The mounting device 10 is mounted to the bicycle handlebar 12 by pivoting the first and second clamp portions 30, 32 about the pin 44 to fit the mounting device 10 about a circumference of the handlebar 12. The brake lever assembly 14 is attached to the mounting device 10 by first inserting the bolt 48 through the bore 34 of the first clamp portion 30, then through a bore 84 in a housing 86 of the brake lever assembly 14 and finally through the bore 34 of the second clamp portion 32. The nut 50 is threaded onto the bolt 48 until the mounting device 10 is fixedly secured to the handlebar 12. The shift lever assembly 16 may be attached to the mounting device 10 before or after the mounting device 10 is mounted to the handlebar 12. The attachment position of the shift lever assembly 16 and the second mounting bracket 52 may be adjusted relative to the brake lever assembly 14 by sliding the mounting bracket 52 along the rails 58, 64 or about the circumference of the handlebar 12 into the desired attachment position. The screw 66 is tightened to secure the mounting bracket 52 in the desired attachment position. FIGS. 7 and 8 show the shift lever assembly 16 or mounting bracket 52 in two alternative attachment positions A and B on the second clamp portion 32 of the mounting device 10.

The present invention allows the shift lever assembly 16 to be adjusted about the axis 28 of the handlebar 12 and parallel to the handlebar 12 without adjusting the position of the brake lever assembly 14 or the first mounting bracket 51. The shift lever assembly 16 may be rotated about the handlebar 12 relative to the brake lever assembly 14 within a range of 30 degrees, in the embodiment shown, between attachment positions A and B (see FIGS. 7 and 8). Likewise, the brake lever assembly 14 or the first mounting bracket 51 may be rotated about the handlebar axis 28 and parallel to the handlebar 12 without adjusting the attachment position of the shift lever assembly 16 or the second mounting bracket 52 to the first mounting bracket 51. In the present invention, the first and second mounting brackets 51, 52 are mounted substantially concentric to the handlebar axis 28 in alternative mounting positions. In alternative embodiments, one or both of the first and second mounting brackets 51, 52 may be configured to mount non-concentric with respect to the handlebar axis 28.

While this invention has been described by reference to one or more embodiments, it will be understood that numerous changes could be made within the spirit and scope of the inventive concepts described. Accordingly, it is intended that the invention not be limited to the disclosed embodiments, but that it include the full scope permitted by the language of the following claims.

What is claimed:

1. A mounting device for mounting first and second bicycle control components to a bicycle handlebar having a handlebar axis, the mounting device comprising:
    a first mounting bracket adjustably mountable to the handlebar about the handlebar axis, one of the first and second bicycle control components attachable to the first mounting bracket; and
    a second mounting bracket adjustably attached to the first mounting bracket, the other of the first and second bicycle control components attachable to the second mounting bracket,
    the second mounting bracket displaceable between alternative attachment positions on the first mounting bracket, the first mounting bracket rotatable between alternative mounting positions on the handlebar.

2. A mounting device according to claim 1, wherein the first and second mounting brackets are mountable substantially concentric to the handlebar axis.

3. A mounting device according to claim 2, wherein the second mounting bracket is slidably attached to the first mounting bracket along a slot between the alternative attachment positions.

4. A mounting device according to claim 2, wherein the second mounting bracket is alternatively attached to the first mounting bracket at a plurality of holes corresponding to the alternative attachment positions.

5. A mounting device according to claim 2, wherein the first and second bicycle control components comprise a brake lever assembly and a shift lever assembly.

6. A mounting device according to claim 1, wherein the first mounting bracket comprises:
    a first clamp portion attachable to the first bicycle control component;
    a second clamp portion hingedly connected to the first clamp portion; and
    a fastener for securing the first and second clamp portions about the handlebar.

7. A mounting device according to claim 6, wherein the first and second mounting brackets are mountable substantially concentric to the handlebar axis.

8. A mounting device according to claim 7, wherein a third bicycle control component is attachable to one of the first and second clamp portions and the second bicycle control component is attachable to the other of the first and second clamp portions.

9. A mounting device according to claim 8, wherein the third bicycle control component is a suspension control assembly.

* * * * *